(12) United States Patent
Lin et al.

(10) Patent No.: US 8,165,241 B2
(45) Date of Patent: *Apr. 24, 2012

(54) CLOSED LOOP FEEDBACK IN MIMO SYSTEMS

(75) Inventors: Xintian E. Lin, Mountain View, CA (US); Qinghua Li, Sunnyvale, CA (US); Ada Shuk Yan Poon, San Leandro, CA (US)

(73) Assignee: Intel Corporation, Santa Clara, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/371,328

(22) Filed: Feb. 13, 2009

(65) Prior Publication Data

US 2009/0147881 A1  Jun. 11, 2009

Related U.S. Application Data

(63) Continuation of application No. 10/939,130, filed on Sep. 10, 2004, now Pat. No. 7,492,829.

(51) Int. Cl.
*H04B 7/02* (2006.01)

(52) U.S. Cl. ...................................... 375/267

(58) Field of Classification Search .......... 375/267, 375/347, 349, 358, 354, 357, 369, 372, 373, 375/374, 215, 294, 327, 376; 370/328, 395.62, 370/507, 503; 700/53; 455/69, 101, 132–141; 702/89; 713/375, 400; 342/103

See application file for complete search history.

(56) References Cited

U.S. PATENT DOCUMENTS

| | | | |
|---|---|---|---|
| 4,559,605 A | 12/1985 | Norsworthy | |
| 5,844,951 A | 12/1998 | Proakis et al. | |
| 5,999,826 A | 12/1999 | Whinnett | |
| 6,597,678 B1 | 7/2003 | Kuwahara et al. | |
| 6,847,805 B2 | 1/2005 | Liu | |
| 6,859,503 B2 | 2/2005 | Pautler et al. | |
| 6,927,728 B2 | 8/2005 | Vook et al. | |
| 7,079,480 B2* | 7/2006 | Agee | 370/204 |
| 7,120,199 B2 | 10/2006 | Thielecke | |
| 7,236,748 B2 | 6/2007 | Li et al. | |
| 7,362,822 B2 | 4/2008 | Li et al. | |
| 7,406,336 B2 | 7/2008 | Astely et al. | |
| 7,492,829 B2 | 2/2009 | Lin et al. | |
| 7,539,253 B2 | 5/2009 | Li et al. | |
| 7,542,454 B2 | 6/2009 | Lin et al. | |
| 7,714,782 B2* | 5/2010 | Davis et al. | 342/377 |

(Continued)

FOREIGN PATENT DOCUMENTS

TW  0571525  1/2004

(Continued)

OTHER PUBLICATIONS

"Channel Feedback Quantization Method for MISO and MIMO Systems." Personal Indoor and Mobile Radio Communications, IEEE International Symposium, vol. 2. Sep. 5, 2004. 805-809.

(Continued)

*Primary Examiner* — Sam K Ahn
(74) *Attorney, Agent, or Firm* — Cool Patent, P.C.; Joseph P. Curtin

(57) ABSTRACT

Feedback bandwidth may be reduced in a closed loop MIMO system by factoring non essential information out of a beamforming matrix.

7 Claims, 6 Drawing Sheets

U.S. PATENT DOCUMENTS

| | | | |
|---|---|---|---|
| 7,961,802 | B2 | 6/2011 | Li et al. |
| 2002/0085643 | A1* | 7/2002 | Kitchener et al. ............ 375/267 |
| 2002/0150109 | A1 | 10/2002 | Agee |
| 2003/0085832 | A1 | 5/2003 | Yu |
| 2003/0086366 | A1 | 5/2003 | Branlund et al. |
| 2003/0087673 | A1 | 5/2003 | Walton et al. |
| 2003/0125040 | A1 | 7/2003 | Walton et al. |
| 2003/0133469 | A1 | 7/2003 | Brockmann et al. |
| 2003/0210750 | A1 | 11/2003 | Onggosanusi et al. |
| 2004/0066761 | A1 | 4/2004 | Giannakis et al. |
| 2004/0121810 | A1 | 6/2004 | Goransson et al. |
| 2004/0178954 | A1 | 9/2004 | Vook et al. |
| 2004/0196871 | A1 | 10/2004 | Terry |
| 2004/0235433 | A1 | 11/2004 | Hugl et al. |
| 2004/0235529 | A1 | 11/2004 | Tarokh et al. |
| 2005/0101259 | A1 | 5/2005 | Tong et al. |
| 2005/0195905 | A1 | 9/2005 | Kowalski |
| 2005/0249298 | A1 | 11/2005 | Kim et al. |
| 2005/0286663 | A1 | 12/2005 | Poon |
| 2006/0039489 | A1 | 2/2006 | Ikram et al. |
| 2006/0056335 | A1 | 3/2006 | Lin et al. |
| 2006/0056531 | A1 | 3/2006 | Li et al. |
| 2006/0068718 | A1 | 3/2006 | Li et al. |
| 2006/0068738 | A1 | 3/2006 | Li et al. |
| 2006/0092054 | A1 | 5/2006 | Li et al. |
| 2006/0165191 | A1 | 7/2006 | Lin et al. |
| 2006/0182080 | A1 | 8/2006 | Yang et al. |
| 2007/0230431 | A1 | 10/2007 | Driesen et al. |
| 2007/0280386 | A1 | 12/2007 | Waes et al. |
| 2008/0069031 | A1 | 3/2008 | Zhang et al. |
| 2008/0108310 | A1 | 5/2008 | Tong et al. |
| 2010/0232527 | A1 | 9/2010 | Li et al. |

FOREIGN PATENT DOCUMENTS

| | | | |
|---|---|---|---|
| WO | WO-2006007148 | A1 | 1/2006 |
| WO | WO-2006029261 | A1 | 3/2006 |
| WO | WO-2006031485 | A1 | 3/2006 |
| WO | WO-2006041595 | A1 | 4/2006 |
| WO | WO-2006078494 | A2 | 7/2006 |
| WO | WO-2006078494 | A3 | 7/2006 |

OTHER PUBLICATIONS

"An Efficient Feedback Method for MIMO Systems with Slowly Time-Varying Channels." University of California, San Diego. Jun. 2004. 760-764.

Office Action in corresponding foreign application issued Dec. 1, 2009. Application No. 2007-531244, filed Jan. 31, 2007.

Conway, J. H., et al., "Packing Lines, Planes, etc.: Packing in Grassmannian Spaces", *Experimental Mathematics*, vol. 5, No. 2, (1996),139-159.

Love, D. J., et al., "Limited Feedback Precoding for Spatial Multiplexing Systems Using Linear Receivers", *IEEE Military Communications conf.*, 2 of 2, ISBN: 0-7803-8140-8,(Oct. 13, 2003),627-632.

Love, D. J., et al., "Limited Feedback Precoding for Spatial Multiplexing Systems", *Globecom'03 2003—IEEE Global Telecommunications Conf.*, 7 of 7, Deptt. of Electrical and Computer Engineering, ISBN: 0-7803-7974-8,(Dec. 1, 2003),1857-1861.

Love, D. J., et al., "Quantized Maximum Ratio Transmission for Multiple-Input Multiple-Output Wireless Systems", *Conf. record of the 36th asilomar conf. on signals, systems & computers*, 1 of 2, ISBN: 0-7803-7576-9,(Nov. 3, 2002),531-535.

Sandhu, S. "Near-Optimal Selection of Transmit Antennas for a Mimo Channel Based on Shannon Capacity", *Signals, systems and computers, 2000, Conf. record of the 34th Asilomar Conf.*, 1, ISBN: 0-7803-6514-3,(Oct. 29, 2000),567-571.

*International Search Report and Written Opinion of the International Searching Authority*; Dated Sep. 16, 2005; PCT/US2005/017774, 15 Pgs.

June, C. R., "Channel Feedback Quantization Method for MISO and MIMO Systems", Personal Indoor and Mobile Radio Communications, *IEEE International Symposium*, vol. 2, (Sep. 5, 2004),805-809.

Onggosanusi, E. N., et al., "A Feedback-based Adaptive Multi-Input Multi-Output Signaling Scheme", Conference Record of the 36th Asilomar Conference On Signals, Systems, & Computers, *IEEE*, US, vol. 1 ( 2), Conf. 36, (Nov. 3, 2002),1694-1698.

"PCT Search Report", PCT/US2005/031979, (Jan. 23, 2006),12 Pgs.

June, C. R., et al., "Channel Feedback Quantization Method for MISO and MIMO Systems", Personal Indoor and Mobile Radio Communications, *15th IEEEE International Symposium on Barcelona, Spain*, USA, *IEEE*, vol. 2, (Sep. 5-8, 2004),805-809.

Jihoon, C. "Interpolation based transmit beamforming for MIMO-OFDM with Limited Feedback", *IEEE International Conference on Paris, France*, Piscataway, NJ, USA,, P20442PCT—PCT Search Report Written Opinion from PCT application serial No. PCT/US2005/031585,(Jun. 20, 2004),249-253 Pgs.

Onggosanusi, E. N., et al., "A Feedback-based Adaptive Multi-Input Multi-Output Signaling Scheme", *Conference Record of the 36th Asilomar conference on signals, systems, & computers*, Pacific Groove, CA, vol. 1 of 1, Conf. 36, (Nov. 3, 2002),1694-1698.

Choi, Jihoon et al., "Interpolation Based Transmit Beamforming for MIMO-OFDM with Limited Feedback", *IEEE Communications Society*, (Jun. 20, 2004),249-253.

Hottinen, A. et al., "Transmit Diversity Using Filtered Feedback Weights in the FDD/WCDMA System", *IEEE 2000* (Feb. 15, 2000),15-21.

*International Search Report and Written Opinion of the International Searching Authority*; Dated Jan. 31, 2006; PCT/US2005/031585, 1-13 Pgs.

"WLAN Access Control Technique", *Modern Electronic Technology*, 27(19), (2004),78-81,83.

"Taiwan Official Letter dated Nov. 8, 2007",3.

"Translation of Taiwan Official Letter dated Nov. 8, 2007",2.

Roh, et al., "Multiple Antenna Channels With Partial Channel State Information at the Transmitter", *IEEE*, vol. 3 (2), (Mar. 2004).

Zoltowski, Michael D., et al., "Simultaneous Sector Processing Via Root-Music for Large Sensor Arrays", *School of Electrical Engineering, Purdue University*, (1990),pp. 372-376.

Van Der Veen, Alle-Jan "Algebraic Methods for Deterministic Blind Beamforming", *Proceedings of the IEEE*, vol. 86, No. 10, Oct. 1998, 1987-2008.

Office Action received for United Kingdom Patent Application 0700222.3, mailed on Oct. 16, 2008, 1 page.

Notice of Allowance received for United Kingdom Patent Application No. 0903596.5, mailed on Sep. 15, 2009, 2 pages.

Office Action received for United Kingdom Patent Application No. 0903596.5, mailed on Mar. 24, 2009, 3 pages.

Office Action received for German Patent Application No. 11 2005 002 205.6, mailed on Nov. 10, 2010, 23 pages including 12 pages of English Translation.

Office Action received for Chinese Patent Application No, 200560030474.X, mailed on Apr. 25, 2011, 7 pages including 4 pages of English Translation.

Office Action received for Chinese Patent Application No, 200580030474.X, mailed on Sep. 18, 2009, 11 pages including 7 pages of English Translation.

Office Action Received for Singaporean Patent Application No. 200701643-9, mailed on Jan. 7, 2009, 6 pages.

Office Action received for Singaporean Patent Application No. 200701643-9, mailed on Apr. 15, 2008, 2 pages.

Office Action received for Japanese Patent Application No. 2007-531244, mailed on Dec. 1, 2009, 17 pages including 13 pages of English Translation.

Office Action received for Korean Patent Application No. 2007-7005741, mailed on Mar. 12, 2008, 2 pages.

Office Action received for Korean Patent Application No. 2007-7005741, mailed on Sep. 25, 2008, 3 pages.

* cited by examiner

CLOSED LOOP FEEDBACK IN MIMO SYSTEMS

RELATED APPLICATION

This application is a Continuation of U.S. Nonprovisional application Ser. No. 10/939,130, by Lin et al., filed Sep. 10, 2004, which is incorporated herein by reference in its entirety for all purposes.

FIELD

The present invention relates generally to wireless networks, and more specifically to wireless networks that utilize multiple spatial channels.

BACKGROUND

Closed-loop multiple-input-multiple-output (MIMO) systems typically transmit channel state information from a receiver to a transmitter. The transmitter may then utilize the information to do beam forming. Transmitting the channel state information consumes bandwidth that might otherwise be available for data traffic.

DESCRIPTION OF EMBODIMENTS

Figure 1:
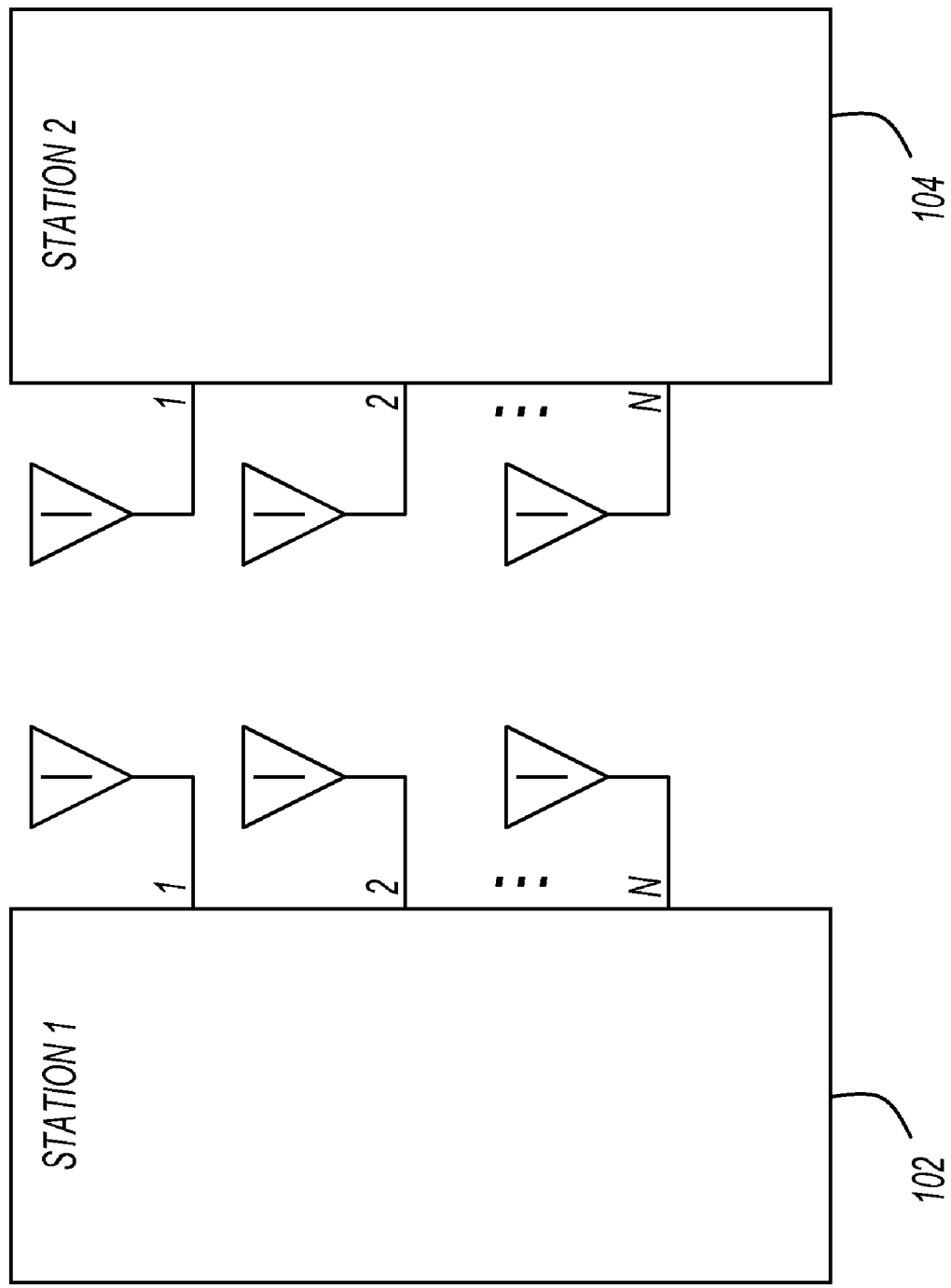
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station, such as a laptop computer, personal digital assistant (PDA), or the like. Further, in some embodiments, stations 102 and 104 are part of a wireless wide area network (WWAN).

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with any other standard, such as any future IEEE personal area network standard or wide area network standard.

Stations 102 and 104 each include multiple antennas. Each of stations 102 and 104 includes "N" antennas, in which N may be any number. In some embodiments, stations 102 and 104 have an unequal number of antennas. The remainder of this description discusses the case in which stations 102 and 104 have an equal number of antennas, but the various embodiments of the invention are not so limited. The "channel" through which stations 102 and 104 communicate may include many possible signal paths. For example, when stations 102 and 104 are in an environment with many "reflectors" (e.g., walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open-loop MIMO systems, a station estimates the state of the channel without receiving channel state information directly from another station. In general, open-loop systems employ exponential decoding complexity to estimate the channel. In closed-loop systems, communications bandwidth is utilized to transmit current channel state information between stations, thereby reducing the necessary decoding complexity, and also reducing overall throughput. The communications bandwidth used for this purpose is referred to herein as "feedback bandwidth." When feedback bandwidth is reduced in closed-loop MIMO systems, more bandwidth is available for data communications.

The current channel state information may be represented by an N×N unitary beamforming matrix V determined using a singular value decomposition (SVD) algorithm, and the transmitter may process an outgoing signal using the beamforming matrix V to transmit into multiple spatial channels. In a straightforward implementation, the receiver sends each element of the unitary matrix V back to transmitter. This scheme involves sending information related to the $2N^2$ real numbers for any N×N complex unitary matrix, in which N is the number of spatial channels in MIMO system.

In some embodiments of the present invention, the beamforming matrix V is represented by $N^2-N$ real numbers instead of $2N^2$ real numbers. By sending $N^2-N$ real numbers instead of $2N^2$ real numbers to represent the beamforming matrix, the feedback bandwidth may be reduced. Non-essential information may be factored out of the beamforming matrix and discarded prior to quantizing parameters that are used to represent the beamforming matrix. For example, non-essential phase information may be factored from each column in the beamforming matrix, and then $N^2-N$ parameters may be utilized to represent the matrix without the non-essential phase information.

A mathematical background of the SVD operation is provided below, and then examples are provided for 2×2 and 3×3 MIMO systems. In the 2×2 closed-loop MIMO example, two angles in $[0, \pi/2]$ and $(\pi, -\pi]$ are used as feedback parameters. Compared to the straightforward example above, the various embodiments of the present invention represented by the 2×2 example below reduce the amount of feedback from eight real numbers to two real numbers per subcarrier. In the 3×3 closed-loop MIMO example, one sign bit plus four angles between $[0, \pi/2]$ and two angles between $[-\pi, \pi]$ are used as feedback parameters. Compared to the straightforward example above, the various embodiments of the present invention represented by the 3×3 example below reduce the amount of feedback from 18 real numbers to six real numbers per subcarrier.

A transmit beamforming matrix may be found using SVD as follows:

$$H = UDV' \quad (1)$$

$$x = Vd \quad (2)$$

in which d is the N-vector of code bits for N data streams; x is the transmitted signal vector on the antennas; H is the channel matrix; H's singular value decomposition is H=UDV'; U and V are unitary; D is a diagonal matrix with H's eigenvalues; V is N×N, and N is the number of spatial channels. To obtain V at the transmitter, the transmitter may send training symbols to the receiver; the receiver may compute the matrix V'; and the receiver may feedback parameters representing V to the transmitter. As described more fully below, the number of feedback parameters used to represent V may be reduced by factoring non-essential phase information from V' and discarding it prior to quantizing the parameters.

2×2 Beamforming Matrices

Any complex 2×2 matrix may be written as $$V = \begin{pmatrix} b_{11} e^{i\phi_{11}} & b_{12} e^{i\phi_{12}} \\ b_{21} e^{i\phi_{21}} & b_{22} e^{i\phi_{22}} \end{pmatrix}. \quad (3)$$

If V is unitary i.e., VV'=I, then $$V = \begin{pmatrix} b_{11} e^{i\phi_{11}} & b_{12} e^{i\phi_{12}} \\ -b_{12} e^{i\phi_{21}} & b_{11} e^{i(\phi_{12}+\phi_{21}-\phi_{11})} \end{pmatrix} \quad (3)$$

in which $b_{11}^2 + b_{12}^2 = 1$. We can further limit $b_{11} \in [0,1]$, $b_{12} \in [0,1]$, $\phi_{ij} \in [-\pi, \pi)$ without loss of generality. There are 4 degrees of freedom in V. After factoring the common phases for each row and column, the unitary matrix V can be written as $$V = \begin{pmatrix} 1 & 0 \\ 0 & e^{i(\phi_{21}-\phi_{11})} \end{pmatrix} \begin{pmatrix} b_{11} & b_{12} \\ -b_{12} & b_{11} \end{pmatrix} \begin{pmatrix} e^{i\phi_{11}} & 0 \\ 0 & e^{i\phi_{12}} \end{pmatrix} = P_L \tilde{V} P_R \quad (4)$$

in which $P_L$ and $P_R$ are pure phase matrices and diagonal. $P_R$ is generated by factoring phase values from each column of V, and $P_L$ is found by factoring phase values from each row of V. $\tilde{V}$ is a magnitude matrix that has entries consisting of scalar quantities that represent the magnitudes of the entries of V. Since $b_{11}^2 + b_{12}^2 = 1$, $\tilde{V}$ can be written as $$\tilde{V} = \begin{pmatrix} \cos\theta & \sin\theta \\ -\sin\theta & \cos\theta \end{pmatrix}, \quad (5)$$

in which $\theta \in [0, \frac{\pi}{2}]$.

Figure 5:
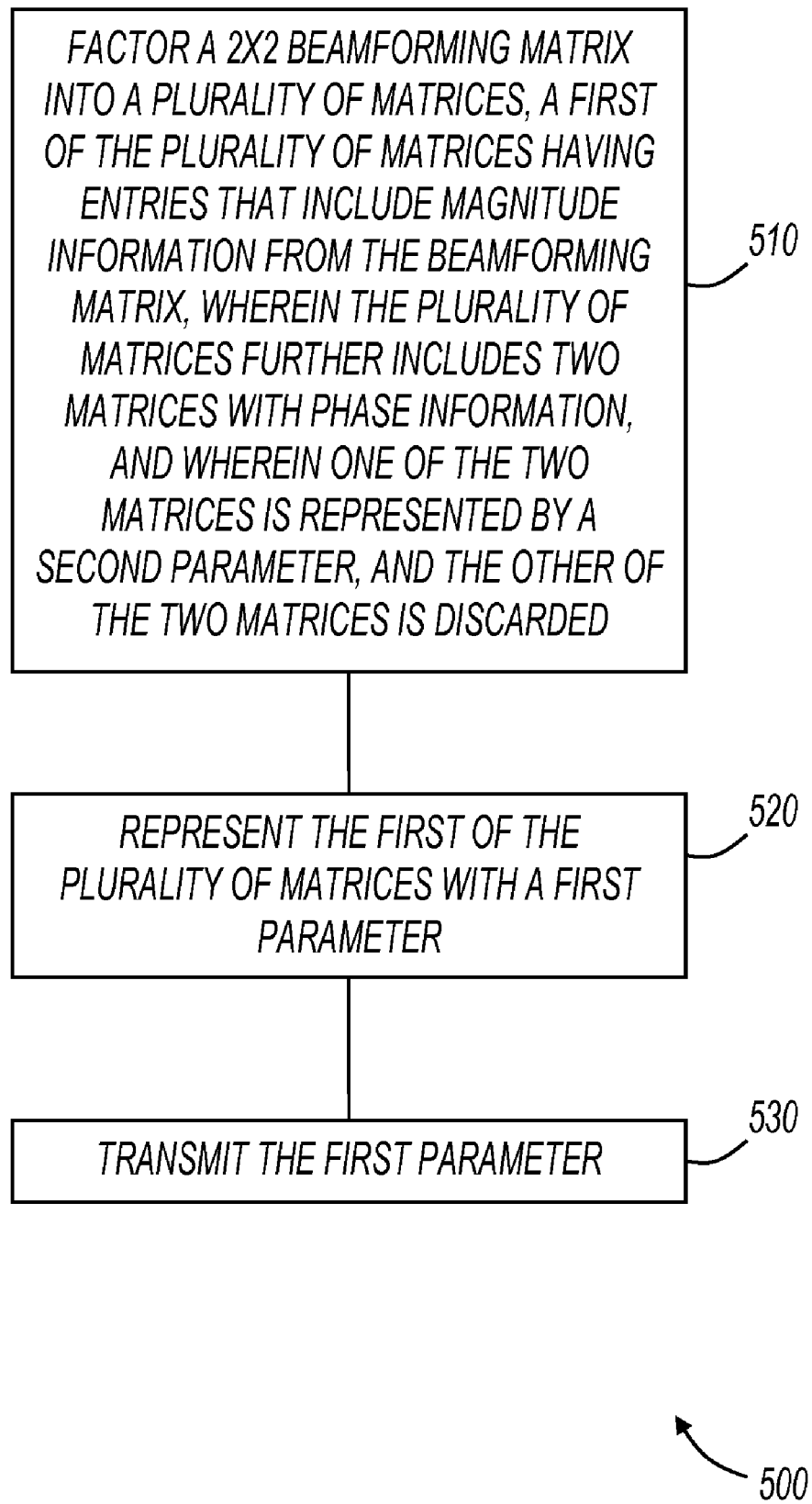
FIGS. 5 and 6 show flowcharts in accordance with various embodiments of the present invention.

In various embodiments of the present invention, only two angles i.e., $\theta$ and $\phi_{11}-\phi_{21}$ are fed back to the transmitter. (530, FIG. 5) The first angle, $\theta$, unambiguously represents $\tilde{V}$, and the second angle, $\phi_{11}-\phi_{21}$, unambiguously represents $P_L$. (520, FIG. 5) In other embodiments of the present invention, a trigonometric function of $\theta$ may be selected as a parameter to feed back. For example, $\cos\theta$ may be fed back as a parameter to represent $\tilde{V}$. In still further embodiments, another parameter may be selected that may unambiguously describe $\tilde{V}$.

The phase information in $P_R$ may be discarded. Equation (1) can be rewritten as $$\begin{aligned}
H &= UDV' \quad (6) \\
&= UD(P_L \tilde{V} P_R)' \\
&= \underbrace{UDP_R'}_{\tilde{D}} \underbrace{(P_L \tilde{V})'}_{\tilde{V}} \\
&= \underbrace{UP_R'}_{\tilde{U}} D \underbrace{(P_L \tilde{V})'}_{\tilde{V}}
\end{aligned}$$

in which we have used the fact that D and $P_R'$ are diagonal and therefore commute. It should be noted that $H = \tilde{U} D \tilde{V}'$ is also a singular value decomposition of H. For the SVD algorithm, the change from U to $\tilde{U}$ only changes the multiplication matrix on the receiver side. When H is a m×n matrix with m≠n, we can still write $H = \tilde{U} D \tilde{V}'$ and the effect of beamforming with $\tilde{V}$ amounts to a rotation in the I/Q plane, which may be taken care of by the training process. Therefore, feeding back $\tilde{V}$ to the transmitter is sufficient for the SVD algorithm. Since $\tilde{V}$ is fully determined by $\theta$ and $\phi_{11}-\phi_{21}$ only two angles are required to feedback and they are between $$\left[0, \frac{\pi}{2}\right] \text{ and } (-\pi, \pi].$$

As stated above, the unitary matrix V may be factored into the product of three matrices:

$$V = \begin{pmatrix} 1 & 0 \\ 0 & e^{i(\phi_{21}-\phi_{11})} \end{pmatrix} \begin{pmatrix} b_{11} & b_{12} \\ -b_{12} & b_{11} \end{pmatrix} \begin{pmatrix} e^{i\phi_{11}} & 0 \\ 0 & e^{i\phi_{12}} \end{pmatrix} \quad (7)$$

-continued $$= \begin{pmatrix} 1 & 0 \\ 0 & e^{i(\phi_{21}-\phi_{11})} \end{pmatrix} \begin{pmatrix} \cos\theta & \sin\theta \\ -\sin\theta & \cos\theta \end{pmatrix} \begin{pmatrix} e^{i\phi_{11}} & 0 \\ 0 & e^{i\phi_{12}} \end{pmatrix}$$

in which $\theta$ and $\phi_{21}-\phi_{11}$ are between $\left[0, \dfrac{\pi}{2}\right]$ and $(-\pi, \pi]$.

The parameters $\theta$ and $\phi_{21}-\phi_{11}$ may be obtained at the receiver as follows:

$$\theta = \arccos(\text{abs}(v_{11})), \; \theta \in [0, \pi/2] \tag{8}$$

$$\phi_{ij} = \begin{cases} \arctan\left(\dfrac{\text{Im}(v_{ij})}{\text{Re}(v_{ij})}\right) + \pi/2, & \text{Im}(v_{ij}) \geq 0 \\ \arctan\left(\dfrac{\text{Im}(v_{ij})}{\text{Re}(v_{ij})}\right) + 3\pi/2, & \text{Im}(v_{ij}) < 0 \end{cases} \tag{9}$$

and the receiver may quantize $\theta$ and $\phi_{21}-\phi_{11}$ and feed them back to the transmitter as parameters that represent $\overline{V}$. The transmitter may reconstruct $\overline{V}$ by determining the amplitudes using $\theta$, and applying a phase rotation to the bottom row using $\phi_{21}-\phi_{11}$.

$$\overline{V} = \begin{pmatrix} \cos\theta & \sin\theta \\ -\sin\theta e^{i(\phi_{21}-\phi_{11})} & \cos\theta e^{i(\phi_{21}-\phi_{11})} \end{pmatrix}. \tag{10}$$

The transmitter may then use $\overline{V}$ for beamforming:

$$x = \overline{V}d \tag{12}$$

3×3 Beamforming Matrices

Any complex, unit 3-vector may be written as $$v = \begin{bmatrix} v_1 \\ v_2 \\ v_3 \end{bmatrix} = e^{i\theta_1} \begin{bmatrix} \cos(\phi_1) \\ \sin(\phi_1)\cos(\phi_2)e^{i\theta_2} \\ \sin(\phi_1)\sin(\phi_2)e^{i\theta_3} \end{bmatrix} \tag{11}$$

in which $\|v\|^2 = \|v_1\|^2 + \|v_2\|^2 + \|v_3\|^2 = 1$;

$\phi_1, \phi_2 \in [0, \pi/2]$ and $\theta_1, \theta_2, \theta_3 \in [-\pi, \pi)$.

Further, any unitary 3 by 3 matrix may be written as $$V = [v_1 \; v_2 \; v_3] = \begin{bmatrix} e^{i\theta_{11}}\cos(\phi_{11}) & e^{i\theta_{12}}\cos(\phi_{12}) & e^{i\theta_{13}}\cos(\phi_{13}) \\ e^{i\theta_{11}}e^{i\theta_{21}}\sin(\phi_{11})\cos(\phi_{21}) & e^{i\theta_{12}}e^{i\theta_{22}}\sin(\phi_{12})\cos(\phi_{22}) & e^{i\theta_{13}}e^{i\theta_{23}}\sin(\phi_{13})\cos(\phi_{23}) \\ e^{i\theta_{11}}e^{i\theta_{31}}\sin(\phi_{11})\sin(\phi_{21}) & e^{i\theta_{12}}e^{i\theta_{32}}\sin(\phi_{12})\sin(\phi_{22}) & e^{i\theta_{13}}e^{i\theta_{33}}\sin(\phi_{13})\sin(\phi_{23}) \end{bmatrix} \tag{12}$$

in which $v'_j v_j = 1$ and $v'_j v_k = 0$ for $j,k = 1,2,3$. The phases on the first row and the first column can be factored as the product of the following three matrices:

$$V = \underbrace{\begin{bmatrix} 1 & 0 & 0 \\ 0 & e^{i\theta_{21}} & 0 \\ 0 & 0 & e^{i\theta_{31}} \end{bmatrix}}_{P_L} \tag{13}$$

$$\underbrace{\begin{bmatrix} \cos(\phi_{11}) & \cos(\phi_{12}) & \cos(\phi_{13}) \\ \sin(\phi_{11})\cos(\phi_{21}) & e^{i\varphi_{22}}\sin(\phi_{12})\cos(\phi_{22}) & e^{i\varphi_{23}}\sin(\phi_{13})\cos(\phi_{23}) \\ \sin(\phi_{11})\sin(\phi_{21}) & e^{i\varphi_{32}}\sin(\phi_{12})\sin(\phi_{22}) & e^{i\varphi_{33}}\sin(\phi_{13})\sin(\phi_{23}) \end{bmatrix}}_{\tilde{V}}$$

$$\underbrace{\begin{bmatrix} e^{i\theta_{11}} & 0 & 0 \\ 0 & e^{i\theta_{12}} & 0 \\ 0 & 0 & e^{i\theta_{13}} \end{bmatrix}}_{P_R}$$

in which $P_L$ and $P_R$ are pure phase matrices and diagonal. $P_R$ is generated by factoring phase values from each column of V, and $P_L$ is found by factoring phase values from each row of V, and in which $\phi_{jk} \in [0,\pi/2]$ and $\cos(\phi_{jk}), \cos(\phi_{jk}), \sin(\phi_{jk}) \geq 0$. $\tilde{V}$ is a magnitude matrix that includes all of the magnitude information originally present in the entries of V. As used herein, the term "magnitude matrix" refers to a matrix that remains after $P_L$ and $P_R$ are factored out of the original beamforming matrix. As shown in the above example, one or more entries in a magnitude matrix may include phase information. It should be noted that $\tilde{V} = [\tilde{v}_1 \; \tilde{v}_2 \; \tilde{v}_3]$ is still unitary since the phase factorization does not change the unitary property.

In various embodiments of the present invention, two parameters are chosen to represent $P_L$, four parameters are chosen to represent $\tilde{V}$, and $P_R$ is discarded. In some embodiments, the angles $\theta_{21}, \theta_{31}$ are selected as parameters to represent $P_L$. Matrix $\tilde{V}$ can be determined by four parameters and a sign bit, and there are many combinations of the four parameters that are subsets of all the angles in $\tilde{V}$. Different combinations result in different complexities in the reconstruction of $\tilde{V}$ at the transmitter. It should be noted that the complexity of extracting all the angles of $\tilde{V}$ is relatively low compared to that of the construction of $\tilde{V}$ based on four parameters. Instead of directly sending angles back, some embodiments may send functions of the selected four angles back. For example, common trigonometric functions such as sin( ), cos( ), and tan( ) may be selected. The various embodiments of the present invention contemplate all possible sets of four parameters to represent $\tilde{V}$. One set of four parameters $\phi_{11}, \phi_{12}, \phi_{21}, \phi_{22}$ and the sign of $\phi_{22}$ provide a solution that is now elaborated. The extraction of the angles $\phi_{11}, \phi_{12}, \phi_{21}, \phi_{22}$ may be performed as:

$$\phi_{11} = \arccos(|v_{11}|) \tag{16}$$

$$\phi_{12} = \arccos(|v_{12}|) \tag{17}$$

$$\phi_{12} = \arctan(|v_{31}|/|v_{21}|) \tag{18}$$

$$\phi_{22} = \arctan(|v_{32}|/|v_{22}|) \tag{19}$$

It should be noted that $\phi_{11}$, $\phi_{12}$, $\phi_{21}$, $\phi_{22}$ are all within $[0,\pi/2]$ instead of $[0,\pi]$ and the sign of $\phi_{22}$ takes only one bit. In various embodiments, the feedback includes one angle in $[0,\pi]$ and three angles in $[0,\pi/2]$.

Figure 6:
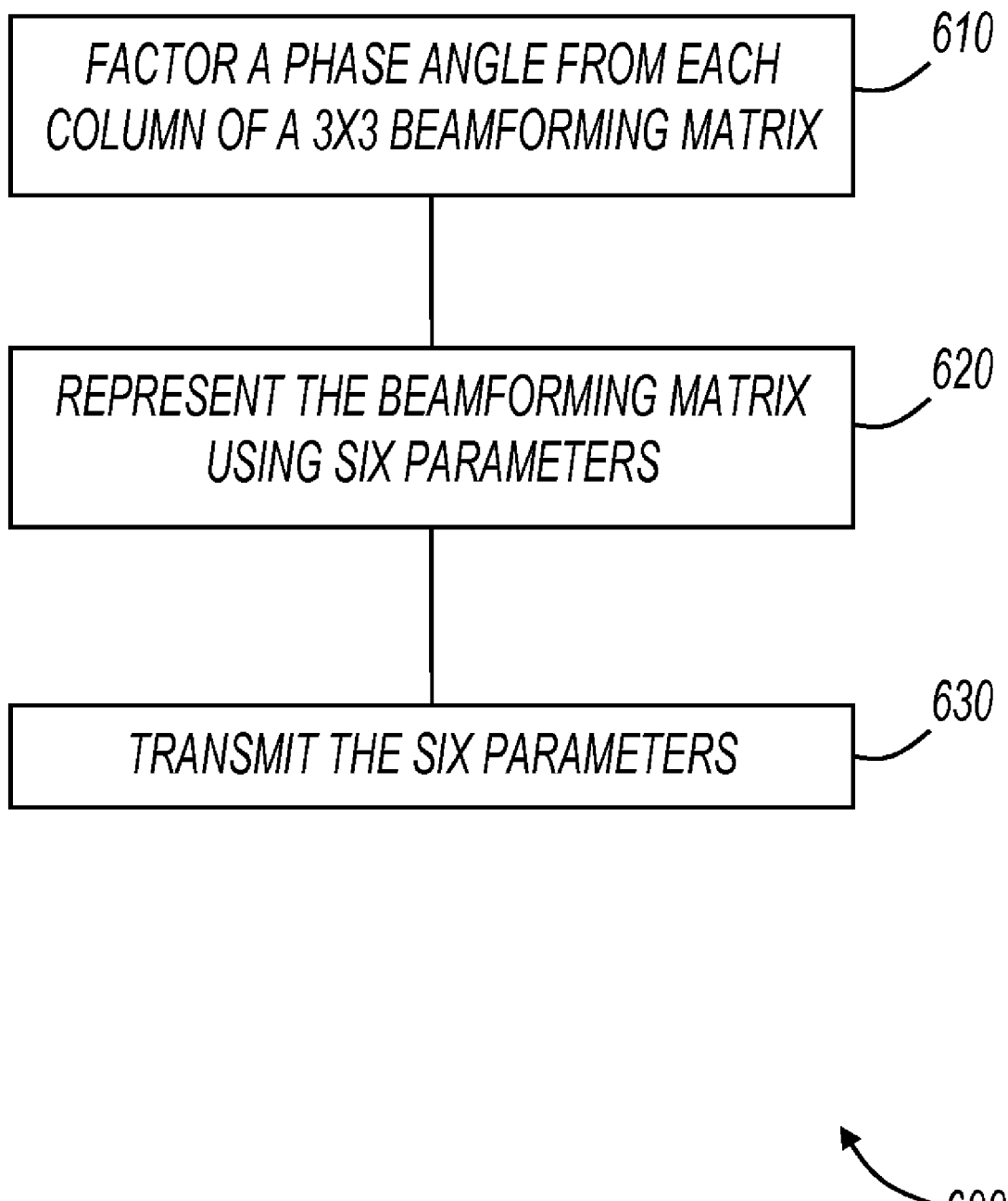
Figure 2:
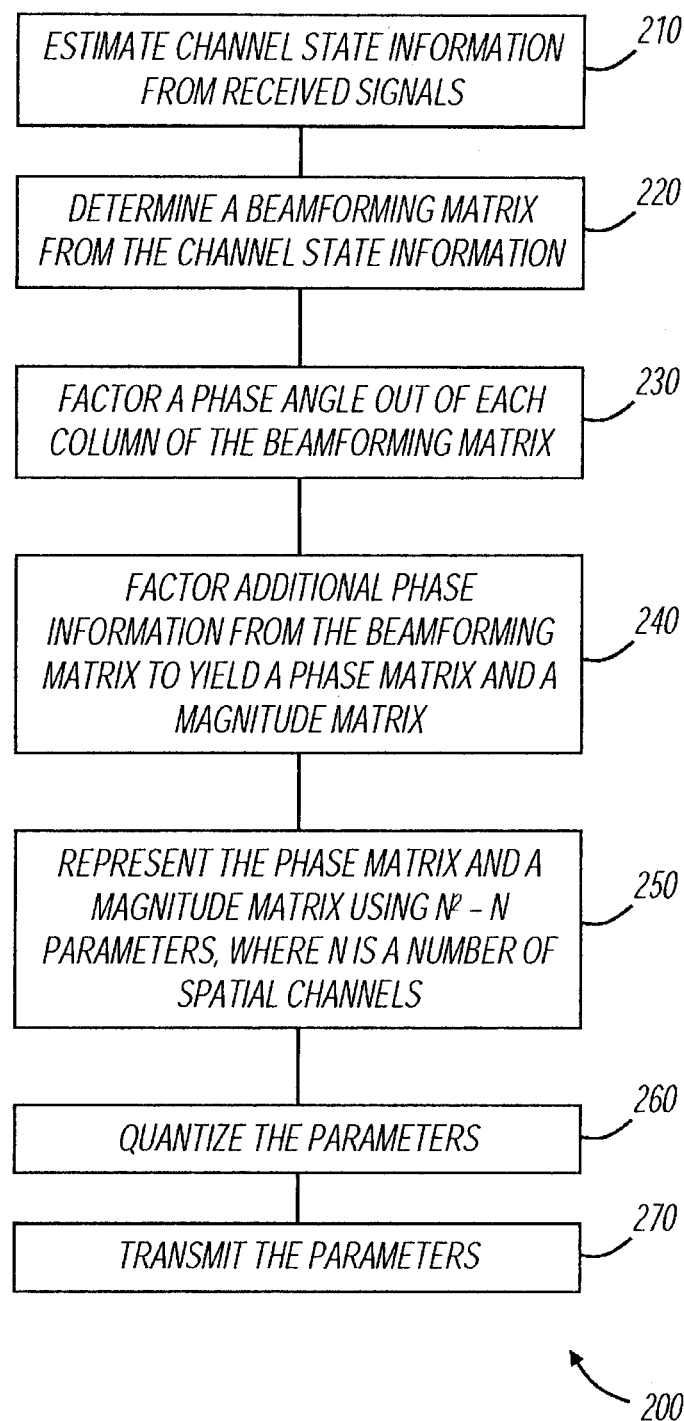

In embodiments using the above parameters to represent $P_L$ and $\tilde{V}$, the receiver quantizes $\theta_{21}$, $\theta_{31}$, $\phi_{11}$, $\phi_{12}$, $\phi_{21}$, $\phi_{22}$ and feeds them back to the transmitter along with sign($\phi_{22}$), which can be found as sign($\phi_{22}$)=sign(angle($\tilde{v}_{22}$)). (620, 630, FIG. 6)

The receiver may receive the parameters, reconstruct $\tilde{V}$, and perform beamforming. The outline of the reconstruction of $\tilde{V}$ is now shown as: computation of $\phi_{22}$, $\phi_{32}$ to reconstruct $\tilde{v}_2$, the second column of $\tilde{V}$; and computation of $\tilde{v}_3$, the third column of $\tilde{V}$ using the unitary property of $\tilde{V}$. We rewrite $\tilde{V}$ as $$\tilde{V} = \begin{bmatrix} \cos(\phi_{11}) & \cos(\phi_{12}) & \tilde{v}_{13} \\ \sin(\phi_{11})\cos(\phi_{21}) & e^{i\varphi_{22}}\sin(\phi_{12})\cos(\phi_{22}) & \tilde{v}_{23} \\ \sin(\phi_{11})\sin(\phi_{21}) & e^{i\varphi_{32}}\sin(\phi_{12})\sin(\phi_{22}) & \tilde{v}_{33} \end{bmatrix} \quad (20)$$

Since $\tilde{v}_2$ is orthogonal to $\tilde{v}_1$ we have $v'_1 v_2 = 0$ or $$c_1 + c_2 e^{i\phi_{22}} + c_2 e^{i\phi_{32}} = 0 \quad (14)$$

in which $$c_1 = \cos(\phi_{11})\cos(\phi_{12})$$

$$c_2 = \sin(\phi_{11})\cos(\phi_{21})\sin(\phi_{12})\cos(\phi_{22})$$

$$c_3 = \sin(\phi_{11})\sin(\phi_{21})\sin(\phi_{12})\sin(\phi_{22}) \quad (15)$$

The $c_j$ are all greater than or equal to zero since $\phi_{11}$, $\phi_{12}$, $\phi_{21}$, $\phi_{22}$ are all within $[0,\pi/2]$. Equation (21) can be explicitly solved by using laws of cosine. The solutions of $\phi_{22}$, $\phi_{32}$ are $$\varphi_{22} = \text{sign}(\varphi_{22})\left[\arccos\left(\frac{c_1^2 + c_2^2 - c_3^2}{2c_1 c_2}\right)\right] \quad (23)$$

$$\varphi_{32} = -\text{sign}(\varphi_{22})\left[\arccos\left(\frac{c_1^2 + c_3^2 - c_2^2}{2c_1 c_3}\right)\right]$$

Since $\tilde{V}'$ is also unitary, the norm of the first row is 1. Considering $\tilde{v}_{13} = \cos(\phi_{13})$ is a positive number, we solve $\tilde{v}_{13}$ as $$\tilde{v}_{13} = \sqrt{1 - \cos^2(\phi_{11}) - \cos^2(\phi_{12})} \quad (24)$$

Since $\tilde{V}'$ is unitary, the second row of $\tilde{V}$ is orthogonal to the second row. $\tilde{v}_{23}$ can be solved as $$\tilde{v}_{23} = \frac{-\cos(\phi_{11})\sin(\phi_{11})\cos(\phi_{21}) - \cos(\phi_{12})\sin(\phi_{12})\cos(\phi_{22})e^{i\varphi_{22}}}{\sqrt{1 - \cos^2(\phi_{11}) - \cos^2(\phi_{12})}} \quad (25)$$

Similarly, $\tilde{v}_{33}$ is $$\tilde{v}_{33} = \frac{-\cos(\phi_{11})\sin(\phi_{11})\sin(\phi_{21}) - \cos(\phi_{12})\sin(\phi_{12})\sin(\phi_{22})e^{i\varphi_{32}}}{\sqrt{1 - \cos^2(\phi_{11}) - \cos^2(\phi_{12})}} \quad (26)$$

Remembering that $$P_L = \begin{bmatrix} 1 & 0 & 0 \\ 0 & e^{i\theta_{21}} & 0 \\ 0 & 0 & e^{i\theta_{31}} \end{bmatrix}, \quad (27)$$

beamforming may be performed as:

$$x = P_L \tilde{V} d \quad (28)$$

Figure 2:
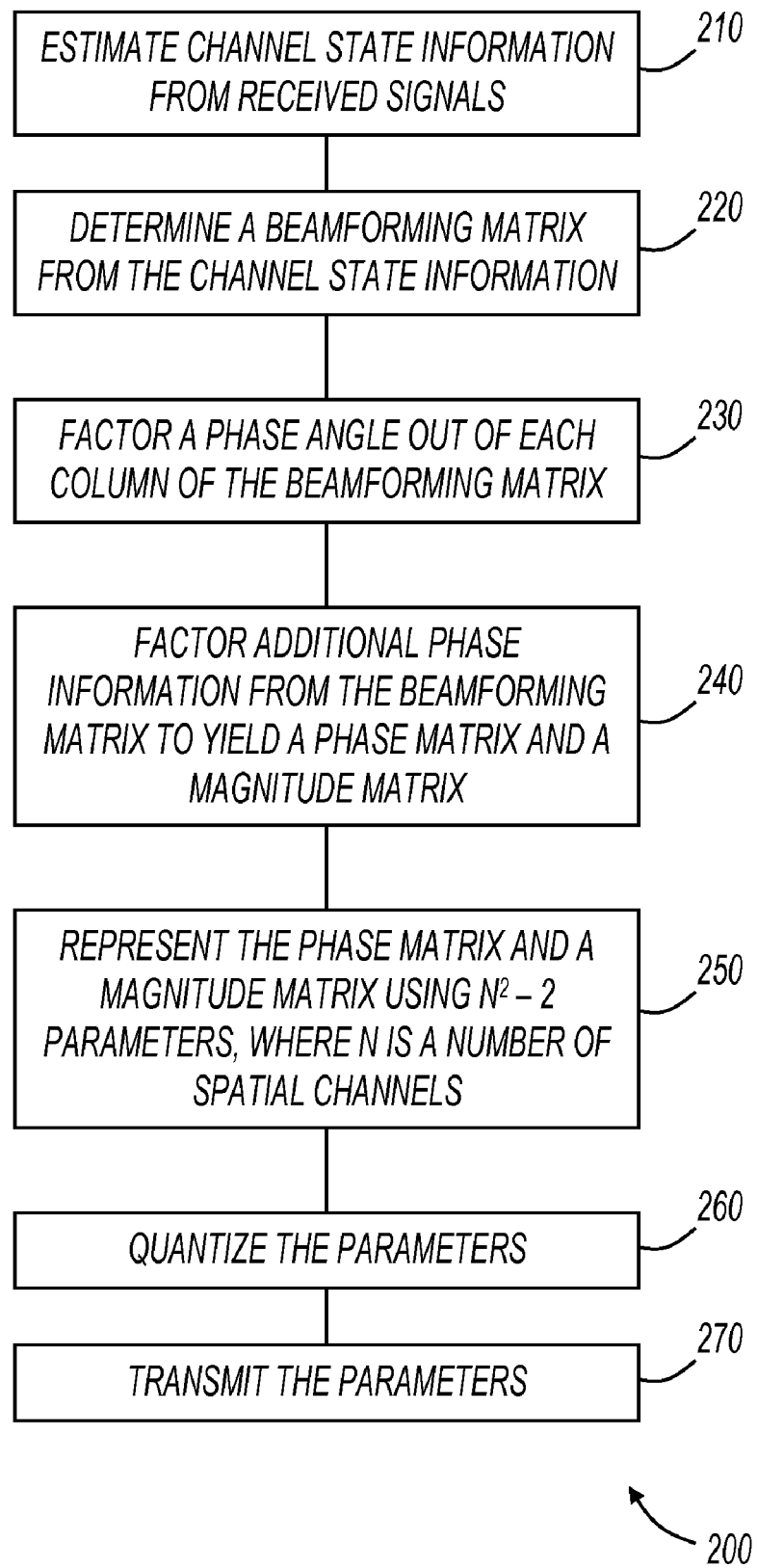
FIGS. 2 and 3 show flowcharts in accordance with various embodiments of the present invention.

FIG. 2 shows a flowchart in accordance with various embodiments of the present invention. In some embodiments, method 200 may be used in, or for, a wireless system that utilizes MIMO technology. In some embodiments, method 200, or portions thereof, is performed by a wireless communications device, embodiments of which are shown in the various figures. In other embodiments, method 200 is performed by a processor or electronic system. Method 200 is not limited by the particular type of apparatus or software element performing the method. The various actions in method 200 may be performed in the order presented, or may be performed in a different order. Further, in some embodiments, some actions listed in FIG. 2 are omitted from method 200.

Method 200 is shown beginning at block 210 in which channel state information is estimated from received signals. The channel state information may include the channel state matrix H described above. At 220, a beamforming matrix is determined from the channel state information. In some embodiments, this corresponds to performing singular value decomposition (SVD) as described above with reference to equations (1) and (7). The beamforming matrix V is also described above.

At 230, a phase angle is factored out of each column of the beamforming matrix. For example, as shown above in equations (5), (8), and (15), the phase matrix $P_R$ may be factored out of the beamforming matrix and discarded. At 240, additional phase information is factored from the beamforming matrix to yield a phase matrix and an magnitude matrix. In the various embodiments of the present invention described above, the additional phase information is represented by the phase matrix $P_L$, and the magnitude matrix is represented by $\tilde{V}$. The magnitude matrix includes the magnitude information from the original beamforming matrix V, and may or may not include phase information. Accordingly, the entries in $\tilde{V}$ may be scalars or complex numbers.

At 250, the phase matrix and magnitude matrix are represented using $N^2 - N$ parameters, where N is a number of spatial channels. For example, in the 2×2 embodiments described above, N=2, and the phase matrix and magnitude matrix are represented by two parameters. One parameter, $\theta$, is used to represent the magnitude matrix and one parameter, $\phi_{11} - \phi_{21}$, is used to represent the phase matrix. Also for example, in the 3×3 embodiments described above, N=3, and the phase matrix and magnitude matrix are represented by six parameters and a sign bit. The phase matrix is represented by two parameters, and the magnitude matrix is represented by four parameters and a sign bit. The choice of parameters to represent the magnitude matrix is large.

At 260, the parameters are quantized. They can be quantized individually or jointly. The parameters are quantized in the ranges appropriate for the range of the parameters selected. For example, in the 2×2 embodiments described above, $\theta$ and $\phi_{11}$-$\phi_{21}$, are quantized between $$\left[0, \frac{\pi}{2}\right] \text{ and } (-\pi, \pi],$$

respectively. At 270, the quantized parameters are transmitted. The quantized parameters may be transmitted using any type of protocol or any type of communications link, including a wireless link such as a wireless link between stations like those described with reference to FIG. 1.

Figure 3:
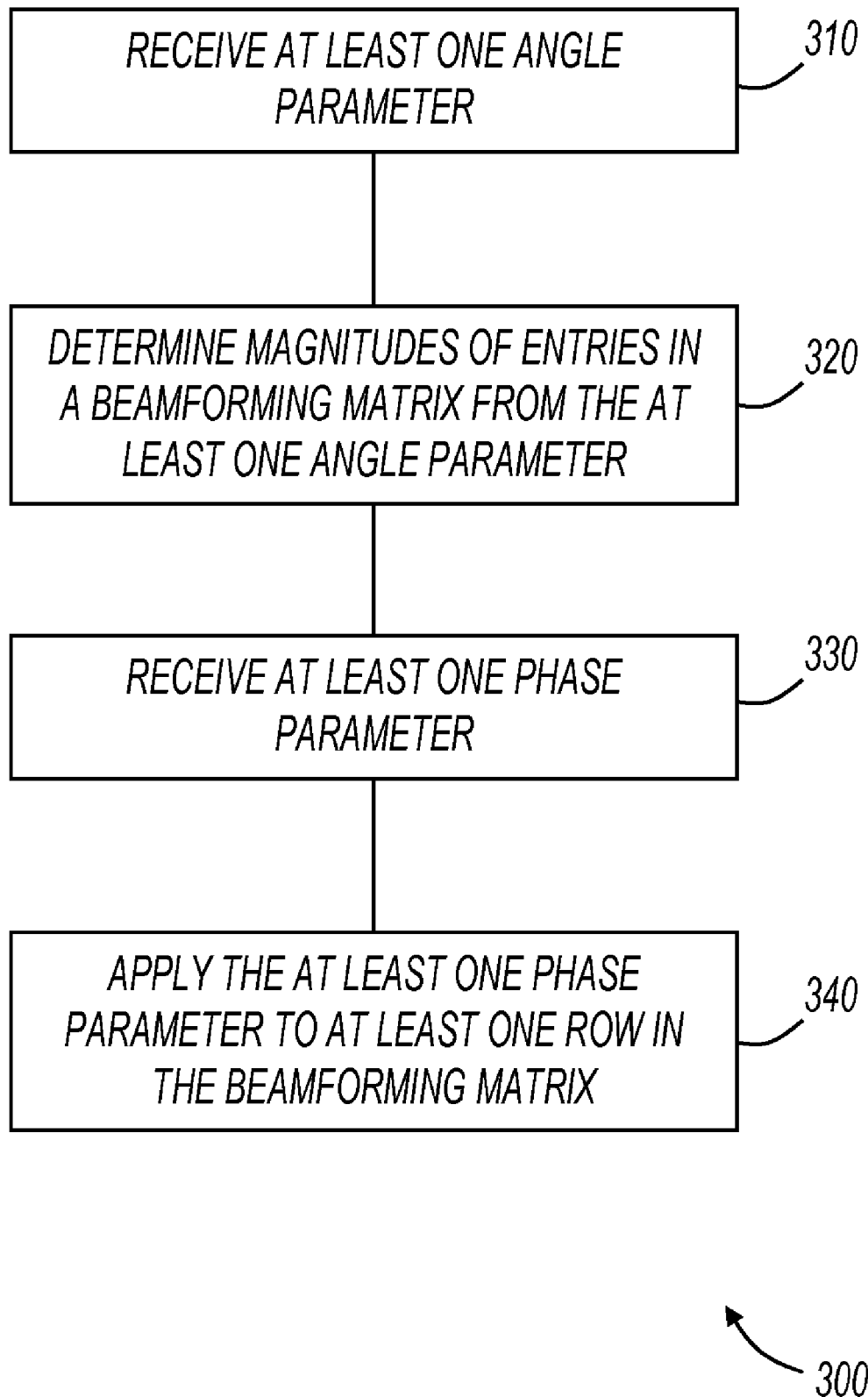

FIG. 3 shows a flowchart in accordance with various embodiments of the present invention. In some embodiments, method 300 may be used in, or for, a wireless system that utilizes MIMO technology. In some embodiments, method 300, or portions thereof, is performed by a wireless communications device, embodiments of which are shown in the various figures. In other embodiments, method 300 is performed by a processor or electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning at block 310 in which at least one angle parameter is received. This may correspond to a transmitter receiving one or more angle parameters that represent a magnitude matrix. For example, the at least one angle parameter may include $\theta$ as described above with reference to equation (6), or may include $\phi_{11}\phi_{12}$, $\phi_{21}$, $\phi_{22}$, as described above with reference to equations (15)-(19).

At 320, magnitudes of entries in a beamforming matrix are determined from the at least one angle parameter. For example, as shown in equation (11), the magnitude of the entries in a 2×2 beamforming matrix may be determined from the angle parameter $\theta$, and as shown in equations (20) and (24)-(26), the magnitude of the entries in a 3×3 beamforming matrix may be determined from the angle parameters $\phi_{11}$, $\phi_{12}$, $\phi_{21}$, and $\phi_{22}$.

At 330, at least one phase parameter is received. This may correspond to the transmitter receiving one or more phase parameters that represent a phase matrix. For example, the at least one phase parameter may include $\phi_{21}$-$\phi_{11}$ as described above with reference to equations (5) and (8), or may include $\phi_{11}$, $\phi_{12}$, $\phi_{21}$, $\phi_{22}$, as described above with reference to equations (15)-(19). At 340, the at least one phase parameter may be applied to at least one row in the beamforming matrix. For example, the phase matrix and magnitude matrix may be multiplied as shown in equation (11) or equation (28). Further, the beamforming matrix may be used in beamforming as shown in equation (28).

Figure 4:
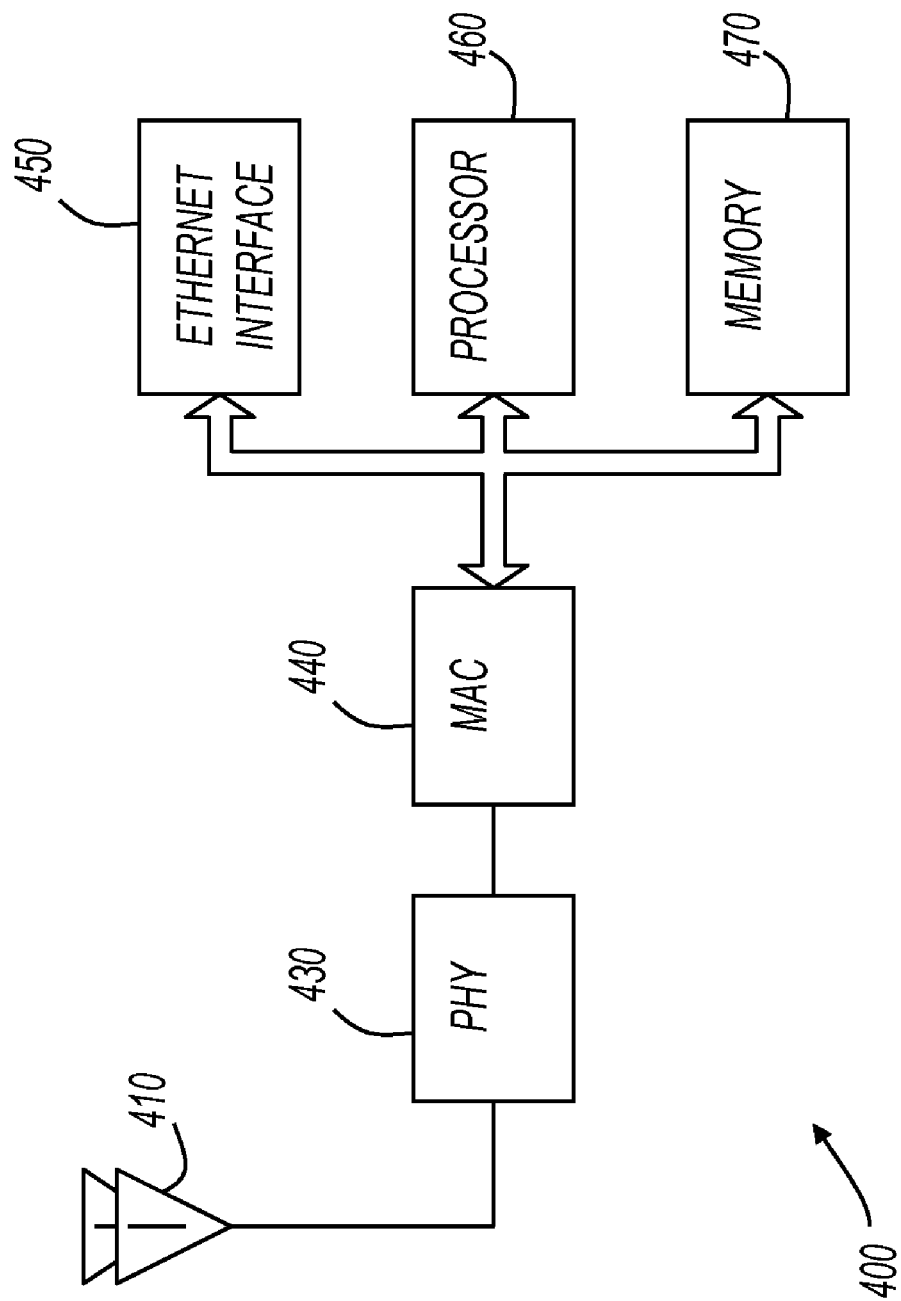
FIG. 4 shows an electronic system in accordance with various embodiments of the present invention.

FIG. 4 shows a system diagram in accordance with various embodiments of the present invention. Electronic system 400 includes antennas 410, physical layer (PHY) 430, media access control (MAC) layer 440, Ethernet interface 450, processor 460, and memory 470. In some embodiments, electronic system 400 may be a station capable of factoring beamforming matrices and quantizing parameters as described above with reference to the previous figures. In other embodiments, electronic system may be a station that receives quantized parameters, and performs beamforming in a MIMO system. For example, electronic system 400 may be utilized in a wireless network as station 102 or station 104 (FIG. 1).

Also for example, electronic system 400 may be a station capable of performing the calculations shown in any of the equations (1)-(28), above.

In some embodiments, electronic system 400 may represent a system that includes an access point or mobile station as well as other circuits. For example, in some embodiments, electronic system 400 may be a computer, such as a personal computer, a workstation, or the like, that includes an access point or mobile station as a peripheral or as an integrated unit. Further, electronic system 400 may include a series of access points that are coupled together in a network.

In operation, system 400 sends and receives signals using antennas 410, and the signals are processed by the various elements shown in FIG. 4. Antennas 410 may be an antenna array or any type of antenna structure that supports MIMO processing. System 400 may operate in partial compliance with, or in complete compliance with, a wireless network standard such as an 802.11 standard.

Physical layer (PHY) 430 is coupled to antennas 410 to interact with a wireless network. PHY 430 may include circuitry to support the transmission and reception of radio frequency (RF) signals. For example, in some embodiments, PHY 430 includes an RF receiver to receive signals and perform "front end" processing such as low-noise amplification (LNA), filtering, frequency conversion or the like. Further, in some embodiments, PHY 430 includes transform mechanisms and beamforming circuitry to support MIMO signal processing. Also for example, in some embodiments, PHY 430 includes circuits to support frequency up-conversion, and an RF transmitter.

Media access control (MAC) layer 440 may be any suitable media access control layer implementation. For example, MAC 440 may be implemented in software, or hardware or any combination thereof. In some embodiments, a portion of MAC 440 may be implemented in hardware, and a portion may be implemented in software that is executed by processor 460. Further, MAC 440 may include a processor separate from processor 460.

In operation, processor 460 reads instructions and data from memory 470 and performs actions in response thereto. For example, processor 460 may access instructions from memory 470 and perform method embodiments of the present invention, such as method 200 (FIG. 2) or method 300 (FIG. 3) or methods described with reference to other figures. Processor 460 represents any type of processor, including but not limited to, a microprocessor, a digital signal processor, a microcontroller, or the like.

Memory 470 represents an article that includes a machine readable medium. For example, memory 470 represents a random access memory (RAM), dynamic random access memory (DRAM), static random access memory (SRAM), read only memory (ROM), flash memory, or any other type of article that includes a medium readable by processor 460. Memory 470 may store instructions for performing the execution of the various method embodiments of the present invention. Memory 470 may also store beamforming matrices or beamforming vectors.

Although the various elements of system 400 are shown separate in FIG. 4, embodiments exist that combine the circuitry of processor 460, memory 470, Ethernet interface 450, and MAC 440 in a single integrated circuit. For example, memory 470 may be an internal memory within processor 460 or may be a microprogram control store within processor 460. In some embodiments, the various elements of system 400 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 450 may provide communications between electronic system 400 and other systems. For example, in some embodiments, electronic system 400 may be an access point that utilizes Ethernet interface 450 to communicate with a wired network or to communicate with other access points. Some embodiments of the present invention do not include Ethernet interface 450. For example, in some embodiments, electronic system 400 may be a network interface card (NIC) that communicates with a computer or network using a bus or other type of port.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

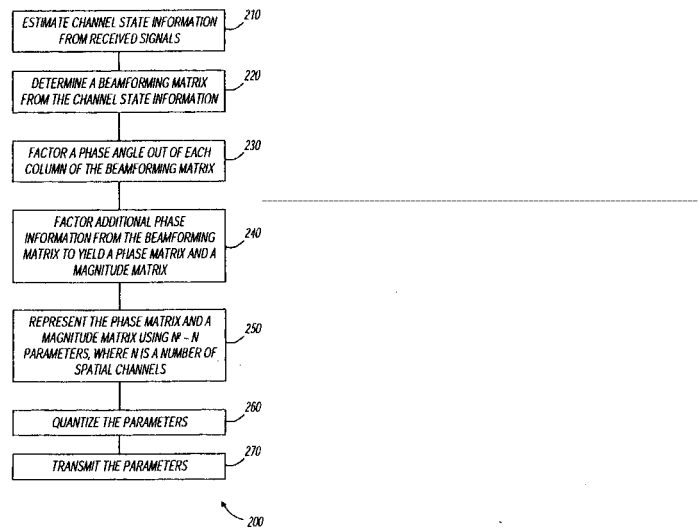

What is claimed is:

1. A method performed by a wireless station in a closed-loop multiple-input-multiple-output (MIMO) wireless network, the method comprising:
 receiving a signal transmitted by N antennas in which N being a number of spatial channels;
 determining a beamforming matrix from the signal;
 factoring phase information out of columns of the beamforming matrix;
 representing the beamforming matrix without the phase information using $N^2-N$ angles; and
 transmitting the angles from the wireless station.

2. The method of claim 1 further comprising quantizing the $N^2-N$ angles prior to transmitting.

3. A non-transitory computer-readable medium having instructions stored thereon that when executed result in a wireless station in a closed-loop multiple-input-multiple-output (MIMO) wireless network performing:
 determining a beamforming matrix from a signal received from N transmit antennas in which N being a number of spatial channels;
 factoring phase information out of columns of the beamforming matrix;
 representing the beamforming matrix without the phase information using $N^2-N$ angles; and
 transmitting the angles from the wireless station.

4. The non-transitory computer-readable medium of claim 3, wherein the instructions further result in the wireless station quantizing the $N^2-N$ angles prior to transmitting.

5. An electronic system, comprising:
 N antennas in which N is a number of spatial channels;
 a processor coupled to the N antennas; and
 an article having a non-transitory machine-readable medium encoded with instructions that when accessed result in the processor estimating channel state information from a received signal, determining an N×N beamforming matrix from the channel state information, factoring a phase angle out of each column of the N×N beamforming matrix, and representing the beamforming matrix without the phase angles using $N^2-N$ angles.

6. The electronic system of claim 5, wherein the instructions further result in the processor quantizing the $N^2-N$ angles.

7. The electronic system of claim 6, wherein the instructions further result in the electronic system transmitting the $N^2-N$ angles.

* * * * *

UNITED STATES PATENT AND TRADEMARK OFFICE
CERTIFICATE OF CORRECTION

| | | |
|---|---|---|
| PATENT NO. | : 8,165,241 B2 | |
| APPLICATION NO. | : 12/371328 | |
| DATED | : April 24, 2012 | |
| INVENTOR(S) | : Xintian E. Lin et al. | |

It is certified that error appears in the above-identified patent and that said Letters Patent is hereby corrected as shown below:

The title page showing the illustrative figure should be deleted to be replaced with the attached title page.

In the drawing sheet, consisting of Fig. 2, should be deleted to be replaced with the drawing sheet, consisting of Fig. 2, as shown on the attached pages.

In column 11, line 33, in claim 2, delete "claim 1" and insert -- claim 1, --, therefor.

In column 12, line 22-23, in claim 5, delete "bearforming" and insert -- beamforming --, therefor.

Signed and Sealed this
Eighth Day of January, 2013

David J. Kappos
*Director of the United States Patent and Trademark Office*

CERTIFICATE OF CORRECTION (continued)

(12) United States Patent
Lin et al.

(10) Patent No.: US 8,165,241 B2
(45) Date of Patent: *Apr. 24, 2012

(54) CLOSED LOOP FEEDBACK IN MIMO SYSTEMS

(75) Inventors: Xintian E. Lin, Mountain View, CA (US); Qinghua Li, Sunnyvale, CA (US); Ada Shuk Yan Poon, San Leandro, CA (US)

(73) Assignee: Intel Corporation, Santa Clara, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/371,328

(22) Filed: Feb. 13, 2009

(65) Prior Publication Data
US 2009/0147881 A1 Jun. 11, 2009

Related U.S. Application Data

(63) Continuation of application No. 10/939,130, filed on Sep. 10, 2004, now Pat. No. 7,492,829.

(51) Int. Cl.
H04B 7/02 (2006.01)
(52) U.S. Cl. ...................................... 375/267
(58) Field of Classification Search ................. 375/267, 375/347, 349, 358, 354, 357, 369, 372, 373, 375/374, 215, 294, 327, 376; 370/328, 395.62, 370/507, 503; 700/53; 455/69, 101, 132–141; 702/89; 713/375, 400; 342/103
See application file for complete search history.

(56) References Cited

U.S. PATENT DOCUMENTS

| | | |
|---|---|---|
| 4,559,605 A | 12/1985 | Norsworthy |
| 5,844,951 A | 12/1998 | Proakis et al. |
| 5,999,826 A | 12/1999 | Whinnett |
| 6,597,678 B1 | 7/2003 | Kuwahara et al. |
| 6,847,805 B2 | 1/2005 | Liu |
| 6,859,503 B2 | 2/2005 | Pautler et al. |
| 6,927,728 B2 | 8/2005 | Vook et al. |
| 7,079,480 B2 * | 7/2006 | Agee ............................ 370/204 |
| 7,120,199 B2 | 10/2006 | Thielecke |
| 7,236,748 B2 | 6/2007 | Li et al. |
| 7,362,822 B2 | 4/2008 | Li et al. |
| 7,406,336 B2 | 7/2008 | Astely et al. |
| 7,492,829 B2 | 2/2009 | Lin et al. |
| 7,539,253 B2 | 5/2009 | Li et al. |
| 7,542,454 B2 | 6/2009 | Lin et al. |
| 7,714,782 B2 * | 5/2010 | Davis et al. ................ 342/377 |

(Continued)

FOREIGN PATENT DOCUMENTS

TW 0571525 1/2004

(Continued)

OTHER PUBLICATIONS

"Channel Feedback Quantization Method for MISO and MIMO Systems." Personal Indoor and Mobile Radio Communications, IEEE International Symposium, vol. 2. Sep. 5, 2004. 805-809.

(Continued)

*Primary Examiner* — Sam K Ahn
(74) *Attorney, Agent, or Firm* — Cool Patent, P.C.; Joseph P. Curtin

(57) ABSTRACT

Feedback bandwidth may be reduced in a closed loop MIMO system by factoring non essential information out of a beamforming matrix.

7 Claims, 6 Drawing Sheets